United States Patent [19]

Steeghs

[11] Patent Number: 4,961,488
[45] Date of Patent: Oct. 9, 1990

[54] DEVICE FOR TRANSFERRING OBJECTS FROM A SUPPLY DEVICE TO A TAKE UP DEVICE

[75] Inventor: Mathijs Steeghs, Panningen, Netherlands

[73] Assignee: Werner & Pfleiderer-Haton B.V., Panningen, Netherlands

[21] Appl. No.: 363,976

[22] Filed: Jun. 9, 1989

[30] Foreign Application Priority Data

Jun. 15, 1988 [NL] Netherlands ............ 8801525

[51] Int. Cl.$^5$ ............................................ B65G 47/26
[52] U.S. Cl. .................... 198/357; 198/358; 198/460; 198/594
[58] Field of Search ............... 198/357, 460, 594, 812, 198/512, 358

[56] References Cited

U.S. PATENT DOCUMENTS

| | | |
|---|---|---|
| 3,106,280 | 10/1963 | Baker . |
| 3,289,815 | 12/1966 | Richter et al. .................. 198/812 |
| 3,354,613 | 11/1967 | Anderson et al. ............... 198/594 X |
| 3,370,693 | 2/1968 | Marsden ........................ 198/460 |
| 3,751,873 | 8/1973 | Toby ............................. 198/812 X |
| 4,131,192 | 12/1978 | Cipolla .......................... 198/460 |
| 4,210,237 | 7/1980 | Gram ............................ 198/812 X |
| 4,469,219 | 9/1984 | Cosse ........................... 198/594 X |
| 4,690,269 | 9/1987 | Takao ........................... 198/460 |

FOREIGN PATENT DOCUMENTS

| | | |
|---|---|---|
| 63400 | 10/1982 | European Pat. Off. . |
| 190906 | 8/1986 | European Pat. Off. . |
| 2201620 | 7/1973 | Fed. Rep. of Germany ...... 198/812 |
| 2647766 | 4/1978 | Fed. Rep. of Germany ...... 198/812 |
| 3009855 | 9/1981 | Fed. Rep. of Germany ...... 198/812 |
| 2587006 | 3/1987 | France . |

*Primary Examiner*—David A. Bucci
*Assistant Examiner*—D. Glenn Dayoan
*Attorney, Agent, or Firm*—Foley & Lardner, Schwartz, Jeffery, Schwaab, Mack, Blumenthal & Evans

[57] ABSTRACT

Device for transferring objects (12) as e.g. lumps of dough—from a supply device—to a take up conveyor (14) provided with take up members (15), the transferring device including an endless conveyor (1) and a sensor (18) near the discharge end (5) of this conveyor (1) to signalize an object (12) present near the discharge end, the discharge end (5) being positioned on a slide (6) which is movable in the same direction as the conveyor (1) and in opposite direction, the discharge end (5) being positioned above the take up conveyor (14) while this is moving in the direction opposite to the direction of movement of the transfer conveyor (1), the sensor (18) for signalizing an object (12) being mounted to the slide (6) which is provided with a second sesnor (19) to signalize the spot of the take up conveyor (14) where an object (12) can be brought onto the conveyor.

5 Claims, 1 Drawing Sheet

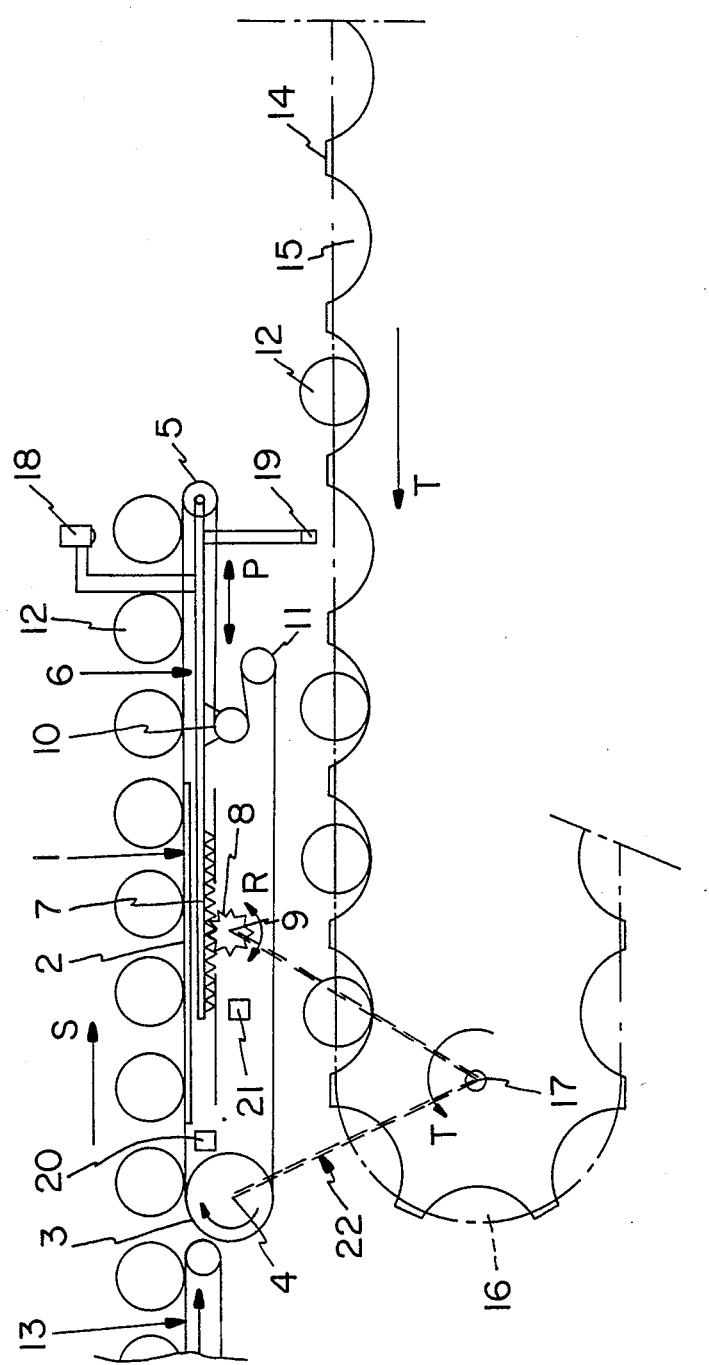

DEVICE FOR TRANSFERRING OBJECTS FROM A SUPPLY DEVICE TO A TAKE UP DEVICE

The invention relates to a device for transferring objects—as e.g. lumps of dough—from a supply device—as a dough dividing or rolling machine—by which the objects are irregularly delivered, to a take up device as a take up conveyor provided with take up members, said transferring device comprising an endless transferring conveyor and a sensor near the discharge end of this conveyor to signalize an object present near said end.

Such a device is described in the European patent application No. 89-20-0077 in the name of applicant.

Now the object of the invention is to supply a device of the type described which is having a higher capacity than the device described in the patent application mentioned above.

According to the invention this is obtained because the discharge end of the transferring conveyor is positioned on a slide being movable in the same direction as in which the conveyor is moving and in opposite direction, said end being positioned above the take up conveyor while this take up conveyor is moving in the direction opposite to the direction of movement of the transfer conveyor, the sensor for signalizing an object being mounted to the slide and said slide being provided with a second sensor to signalize the spot of the take up conveyor where an object can be brought onto said conveyor.

In this way it is obtained that the end of the transfer conveyor may move along with the take up conveyor or may moves in the opposite direction such that an object arriving near the end of the take up conveyor can be brought on the desired spot onto the take up conveyor.

In particular it will be provided, that the velocity of the transfer conveyor, the velocity of the slide in both directions and the velocity of the takes up conveyor will be equal or almost equal to each other.

In this way a good transfer of the objects can be assured.

It can also be provided that the conveyors and the slide are driven from a common shaft. By this a simple and so cheap device is obtained It is, however, also possible that the velocity of the slide in the direction of movement of the transfer conveyor is less than that of this conveyor. So in this case during moving slide the velocity difference between the end of the transfer conveyor and of the take up conveyor will be smaller because of which the transfer of an object will take place more gradually.

According to a further embodiment of the invention still a third and fourth sensor will be provided for signalizing the two end positions of the slide.

The invention is further dsscribed by reference to an embodiment, a side view of which is schematically shown in the drawing.

The transfer device shown in the drawing comprises the endless conveyor 1 being shaped by a conveyor belt 2, running over the return roll 3 at the one side, driven by means of the shaft 4 and over the return roll 5 at the other side, being supported by a slide 6.

The slide 6 is supported in a not further indicated way such that it is movable in the direction of the double arrow P.

The movement of the slide 6 can take place by means of the gear rack 7 connected to the slide and cooperating with a gear wheel 8 mounted on a driven shaft 9. The shaft 9 can be rotated in two directions as indicated by the arrow R, so that the slide 6 can be moved in two directions as indicated by the arrow P.

To have the conveyor belt 2 tensioned during the movement of the slide 6 the conveyor belt is running over a return roll 10 being supported by the slide 6 and over a return roll 11 being stationary positioned.

The supply of objects 12 to the transfer conveyor 1 may take place by means of a not further described conveyor 13. The conveyors 1 and 13 are moving in the direction of the arrow S.

Below the conveyor 1 the take up conveyor 14 is present which can be provided with the take up members 15. The conveyor 14 is guided over the return roll 16 being driven by means of the shaft 17. The shaft 17 is rotated in the direction of the arrow T, so that the conveyor 14 is moving in opposite direction in respect of the conveyor 1. The velocities of the conveyors 1 and 14 can be equal to each other by coupling the shafts 4 and 17. It is also possible to drive the slide 6 and conveyors 1, 14 by a common shaft, represented schematically by linkage 22 in the drawing.

A first sensor 18 is mounted to the slide 6 for signalizing an object which is present near the return roll 5. Further the slide is carrying a second sensor 19 for signalizing a take up member 15 of the conveyor 14. Finally a third sensor 20 and a fourth sensor 21 are provided for signalizing the two end positions of the slide 6.

The operation of the device is now as follows. The conveyors 1 and 14 are continuously driven. When the sensor 19 is signalizing a take up member 15 of the conveyor 14 while at that moment the sensor 18 is not signalizing an object 12, this means that the object 12 is too late. Then the slide 6 is brought into movement in the same direction as the take up conveyor 14 and is moving synchroneously with this, so that the return roll 5 is held in such a position in respect of the conveyor 14 that an arriving object 12 can be deposited in a take up member 15.

When now such an object 12 is reaching the sensor 18 during said movement of the slide 6, then the slide 6 will be stopped at once or with some retardation and the object will be brought into the take up member 15.

When otherwise the sensor 18 is signalizing an object 12 which so is present near the return roll 5 while at that moment the sensor 19 is not signalizing a take up member 15, this means that the object 12 is too early. Then the slide 6 is brought into movement in a direction opposite to the direction of movement T of the conveyor 14. So then the object 12 is moving towards a take up member 15 being destined for it. As soon as the sensor 19 is signalizing a take up member 15 the slide 6 will be brought to a stop and the object 12 will be supplied to the related take up member 15.

When the slide 6 is moving in the same direction as the take up conveyor 14, so in the direction of the arrow T and when no object 12 is arriving near the sensor 18, then the slide 6 will be stopped in the end position by means of the sensor 20 and will remain in this position.

When now an object 12 is arriving near the sensor 18 and the sensor 19 is signalizing no take up member then the slide 6 will be brought into movement in the direction of the arrow S and will remain moving in this direction till the sensor 19 is signalizing a take up member 15.

At that moment the slide 6 will be stopped and the related object will be deposited in a take up member 15.

When the sensor 18 is signalizing an object 12 and the sensor 19 is simultaneously signalizing a take up member, then the slide 6 will remain stationary and the object is at once deposited in the take up member.

It will be obvious that only a possible embodiment of the device according to the invention is shown in the drawing and is described above and that many modifications can be applied without leaving the inventive concept.

I claim:

1. Device for transferring objects from a supply device, by which the objects are irregularly delivered, to a take up device having a take up conveyor provided with take up members, said transferring device comprising:

an endless transfer conveyor; and a sensor disposed near a discharge end of the transfer conveyor to detect an object present near said discharge end;

wherein said discharge end of the transferring conveyor is positioned on a slide, the slide being movable back and forth along a conveying direction of the transfer conveyor, said discharge end being positioned above the take up conveyor, which take up conveyor moves in a direction opposite to the conveying direction the transfer conveyor, the sensor for detecting an object being mounted to the slide and said slide being provided with a second sensor to detect the spot of the take up conveyor where an object can be brought onto said take up conveyor.

2. Device according to claim 1, wherein the velocity of the transfer conveyor, the velocity of the slide in both back and forth directions and the velocity of the take up conveyor will be substantially equal to each other.

3. Device according to claim 2, further comprising means for driving the conveyors and the slide from a common shaft.

4. Device according to claim 1, the velocity of the slide in the conveying direction of the transfer conveyor is less than that of the transfer conveyor to allow a gradual transfer of the object.

5. Device according to claim 1, further comprising a third and fourth sensor for detecting two predetermined end positions of the slide.

* * * * *